US006467919B1

(12) United States Patent
Rumsey et al.

(10) Patent No.: US 6,467,919 B1
(45) Date of Patent: Oct. 22, 2002

(54) MIRROR WITH SPLIT BALL MOUNT AND HOLD-OPEN DEVICE

(75) Inventors: Wayne Rumsey, Holland, MI (US); Timothy S. DeVries, Jenison, MI (US); John W. Carter, Holland, MI (US); Jason Hallack, Holland, MI (US)

(73) Assignee: Gentex Corporation, Zeeland, MI (US)

(*) Notice: Subject to any disclaimer, the term of this patent is extended or adjusted under 35 U.S.C. 154(b) by 0 days.

(21) Appl. No.: 10/004,254

(22) Filed: Nov. 2, 2001

(51) Int. Cl.$^7$ ................................................ G02B 7/182
(52) U.S. Cl. ...................... 359/872; 359/871; 359/875; 359/876; 359/877
(58) Field of Search ................................ 359/872, 871, 359/875, 876, 877; 248/481

(56) References Cited

U.S. PATENT DOCUMENTS

| 4,225,212 A | * | 9/1980 | Grabowski ................... 359/508 |
| 6,068,380 A | | 5/2000 | Lynn et al. |
| 6,326,613 B1 | * | 12/2001 | Heslin et al. ......... 250/214 AL |

OTHER PUBLICATIONS

Exhibit A discloses photographs 1–7 of a prior art mount for an automotive rearview mirror, manufactured and sold by Reitter & Schefenacker, GMBH & Co, KG, EckenerstreBe 2, 73730 Essignen, Germany, at least one year prior to the filing date of the present invention. The mirror mount includes a split ball portion that forms part of a ball mount, and is die–cast of a zinc alloy.

* cited by examiner

Primary Examiner—Mohammad Sikder
(74) Attorney, Agent, or Firm—Brian J. Rees; Price Heneveld Cooper Dewitt & Littton

(57) ABSTRACT

A mirror construction includes an interior rearview mirror housing having a socket, and includes a mirror mount having a ball section that angularly and adjustably engages the socket to form a ball connection. The ball section has a radially open portion permitting wiring to be laid laterally into the ball section to facilitate assembly. A wedge fits in the open portion for holding the open portion so that the ball connection cannot distort and collapse over time. The mount includes a window for snap-attachment of an electrical connector for the wiring.

19 Claims, 4 Drawing Sheets

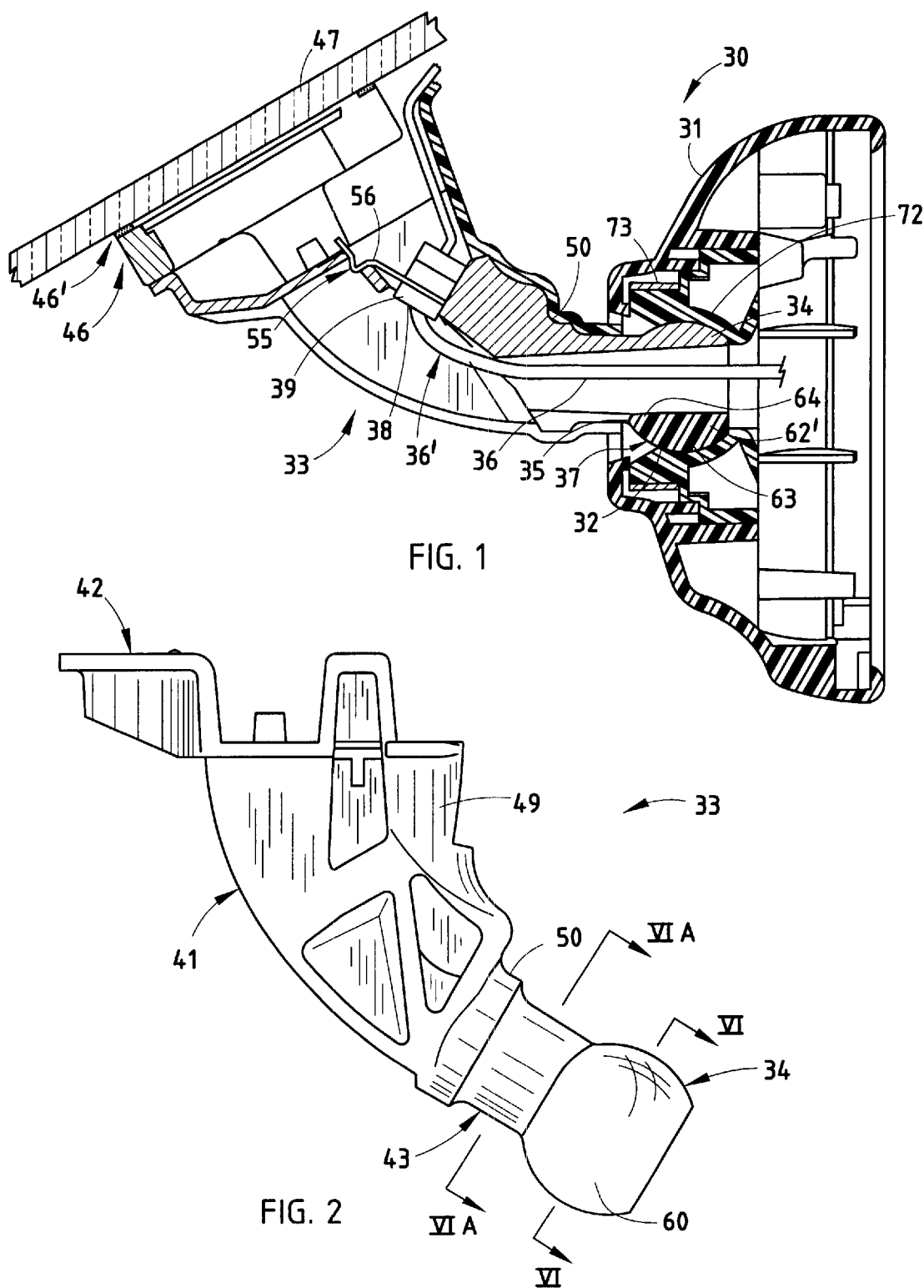

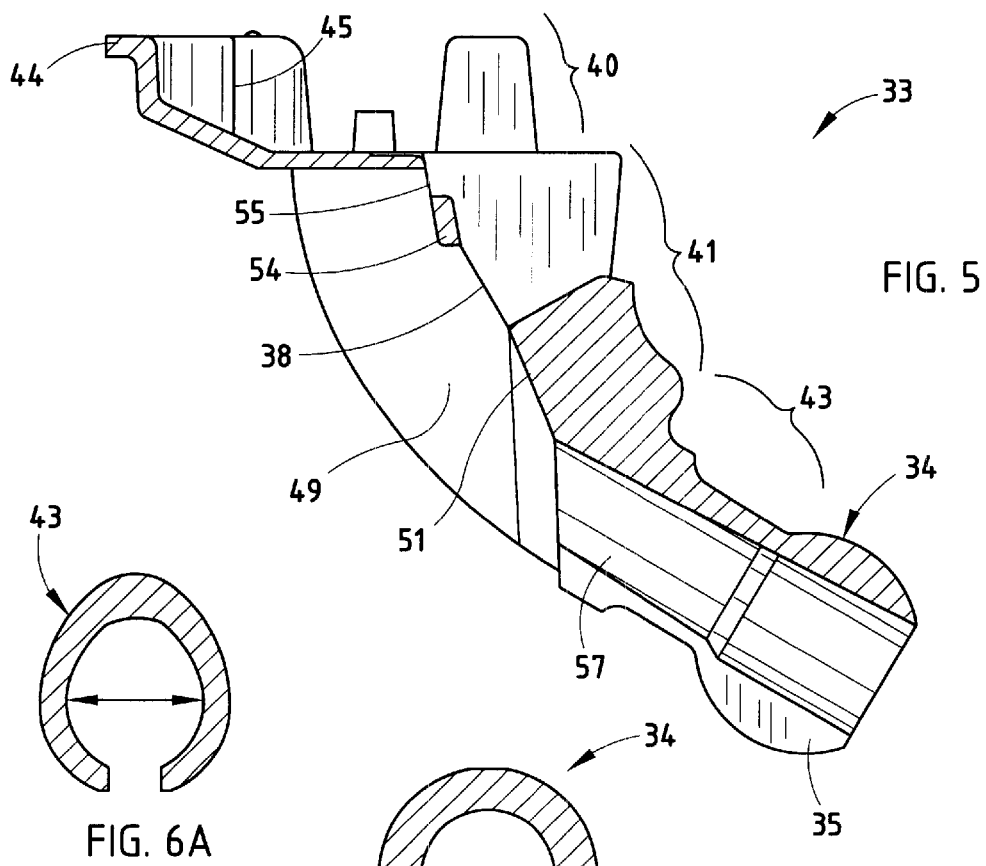
FIG. 5
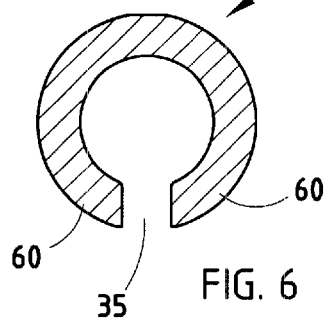
FIG. 6A
FIG. 6
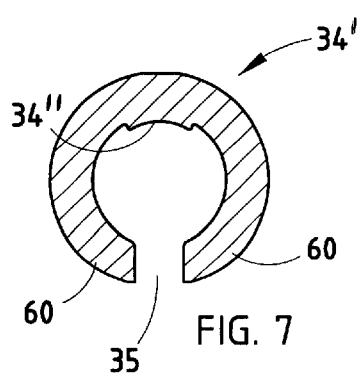
FIG. 7
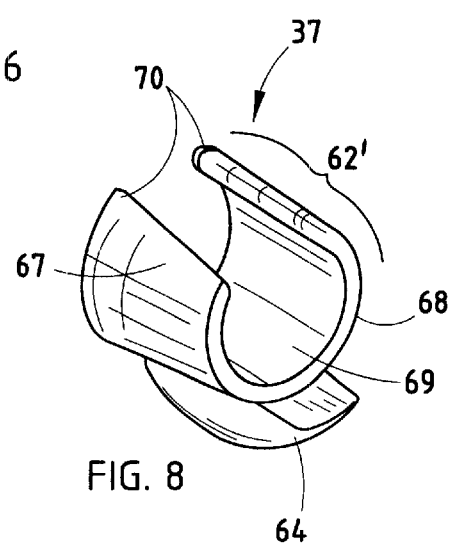
FIG. 8

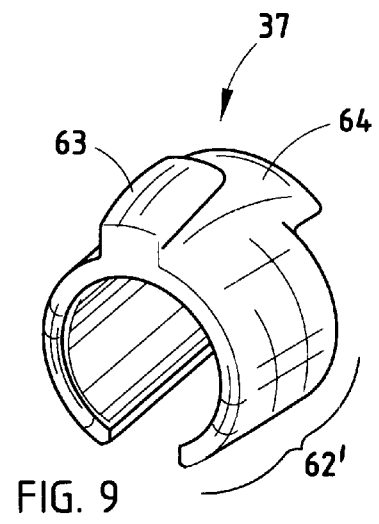
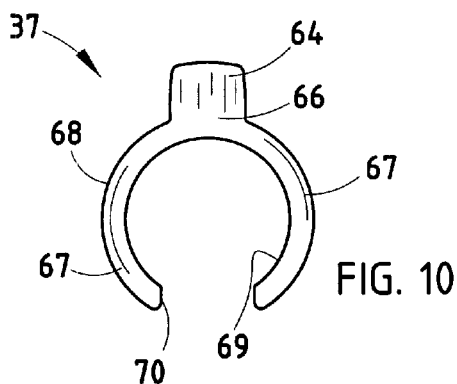
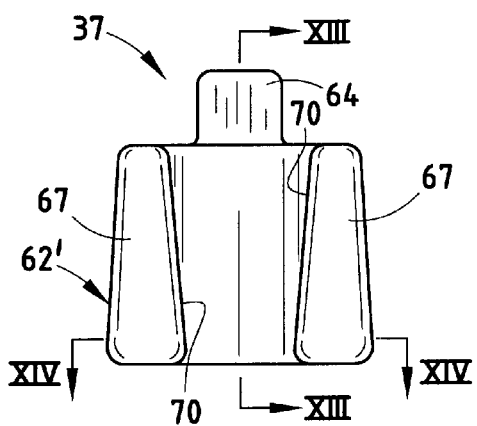
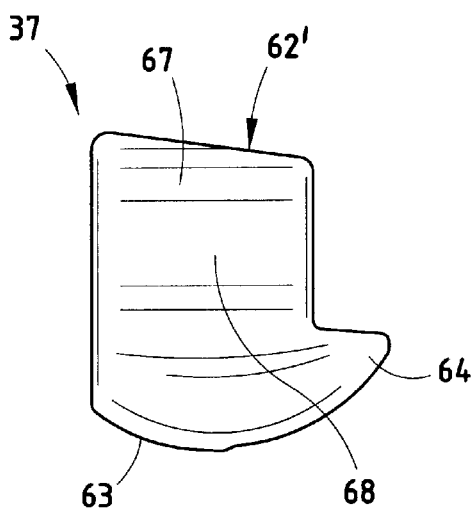
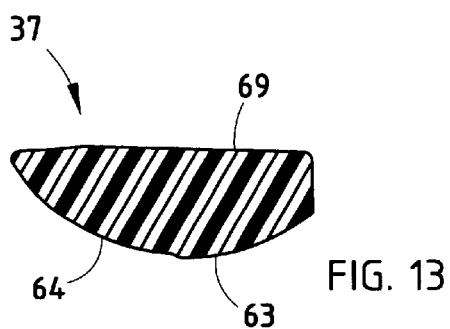
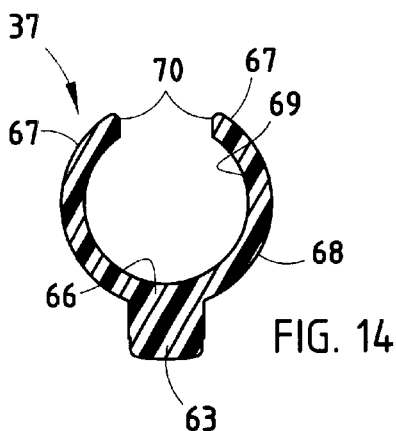

MIRROR WITH SPLIT BALL MOUNT AND HOLD-OPEN DEVICE

BACKGROUND

The present invention relates to mirrors mounted for angular adjustment on ball mounts, and more particularly relates to a mirror having a ball mount adapted to receive laterally-laid-in wiring to facilitate assembly, but that is further constructed to provide a consistent torsional adjustment force in the form of a robust and durable angularly-adjustable ball mount.

Most modern vehicles include an interior rearview mirror mounted to a center and top of a front windshield by an adjustable ball mount that permits angular adjustment of the mirror. Many if not most of these modern interior rearview mirrors include components electrically connected to the vehicle electrical system (e.g. for power as well as to a controller or processor in the instrument panel). For example, modern mirrors often include electrically-operated glare-reducing layers, keyless entry, day/night sensing, temperature sensing, and communication devices. Typically, the electrical connection is done with wiring that extends from the mirror along or through a windshield mount up under a headliner of the vehicle and then through a vehicle body pillar to the vehicle's main electrical system. Routing the wiring from the mirror up to the headliner can be an appearance problem when the wiring is routed around an adjustment ball connection (i.e. outside of the ball connection), because the wiring is in a position where it is relatively easily seen. Covers and wire shields can be used to hide the wiring, but when the wiring is routed around the ball, the covers and shields tend to result in a bulky and undesirably large structure.

Many modern vehicles often include a tubular component with a bored ball or apertured connection to permit routing of wiring. However, threading wires through the passageway is cumbersome and not as efficient for assembly as desired, since wires must be pushed through. Further, the passageway is usually not large enough for an electrical connector to pass through, such that the electrical connector must be attached to the wires (i.e. "blocking") after extending the wires through the tubular component. This can cause assembly inefficiencies, including assembly defects such as poor attachment of the connector to the conductors in the wiring, since the tubular component is somewhat "in the way". Further, such defects occur when the assembly is more expensive (i.e. a significant part of the assembly is finished) and also at a time when the defects are more difficult to fix (i.e. the connector must be ripped off the wiring before the wiring can be removed and new wiring put in place).

Split ball connectors in mirror constructions would be advantageous in that they facilitate assembly by permitting wiring to be laid into the ball connection from a side of the ball connection, instead of having to thread the wiring through the ball connection longitudinally. However, a major problem with split ball connectors is their inability to maintain a consistent and high quality torsional friction force that resists yet permits small angular adjustment. The torsional force must be maintained for safety reasons, so that a mirror stays in an adjusted position. Further, the feel of adjustment to a vehicle driver can be very important. In particular, a gritty or non-uniform feel during mirror adjustment can give a vehicle driver a false impression of poor vehicle quality. Split ball connectors often have difficulty with all of these problems. For example, split ball connectors have an edge at the split that can rub and scrape in a non-uniform manner, giving a "gritty" feel upon adjustment, and/or can let dirt and dust into the bearing interface also causing a non-uniform frictional force upon adjustment, and/or can cause an unacceptable "grip-and-slip" type movement. Also, split ball connectors can creep and change shape and/or may experience a change in physical properties, with time, temperature, and stress, resulting in noticeable and unacceptable changes in torsional frictional resistance. In particular, the zinc die cast materials often used for mirror mounts can have this problem. It is not considered cost-effective nor feasible in the present competitive automotive industry to use costly high-grade materials that will not be adversely affected by time, temperature, and stress. Nor is it feasible to "over-design" parts by significantly increasing their size and structure to solve these problems, since the added weight and added cost of material are problematic, and further the increased size can adversely affect a vehicle driver's ability to see past the mirror out the vehicle front window.

Accordingly, an apparatus solving the aforementioned problems and having the aforementioned advantages is desired.

SUMMARY OF THE PRESENT INVENTION

In one aspect of the present invention, a mirror construction for attachment to a vehicle proximate a vehicle front window includes an interior rearview mirror assembly, and a mirror mount adapted for attachment to a vehicle component. A ball connection is provided including a ball section on one of the mirror assembly and the mirror mount, and including a socket on the other of the mirror assembly and the mirror mount. The ball section has a sphere-defining surface that slidably angularly engages a mating surface on the socket to permit angular adjustment and further has an open portion that interrupts the sphere-defining surface to permit wiring to be laid laterally inside the ball section to facilitate assembly. The ball connection further includes a holder for holding open the open portion so that the ball section maintains a desired shape and the ball connection maintains a desired torsional frictional resistance to angular adjustment even after extended use.

In another aspect of the present invention, a mirror construction includes an interior rearview mirror assembly having a housing having a socket, and includes a mirror mount adapted for attachment to a vehicle component and including a ball section. The ball section angularly and adjustably engages the socket to form a ball connection, the ball section having a radially open portion permit wiring to be laid laterally into the ball section to facilitate assembly. The mirror construction further includes a holder engaging the ball section for holding a shape of the ball section so that the ball section cannot distort and collapse over time.

In another aspect of the present invention, a method of constructing a mirror comprising steps of providing an interior rearview mirror assembly including a socket, and a mirror mount adapted for attachment to a vehicle component, the mirror mount including a ball section with a radially-open portion. The method further includes laying wiring into the radially-open portion of the ball section, and placing a holder in the open portion to hold the open portion in an open condition so that the ball connection cannot distort and collapse over time. The method still further includes operably fitting the ball section into the socket for angular adjustment, with the ball engaging the socket with sufficient friction to hold the rearview mirror in selected angular positions.

These and other aspects, objects, and features of the present invention will be understood and appreciated by those skilled in the art upon studying the following specification, claims, and appended drawings.

BRIEF DESCRIPTION OF DRAWINGS

FIG. 1 is a vertical cross section showing a side elevation of a mirror construction with a mount embodying the present invention;

FIGS. 2–4 are side, top and bottom views of the mount of FIG. 1;

FIGS. 5–6 and 6A are cross-sections taken along the lines V—V, VI—VI and VIA—VIA in FIGS. 4, 2, and 2, respectively;

FIG. 7 is cross section similar to FIG. 6 of a modified mount similar to the mount of FIG. 1;

FIGS. 8–9 are front and rear perspective views of the wedge shown in FIG. 1;

FIGS. 10–12 are front, top and side views of the wedge of FIG. 8; and

FIGS. 13 and 14 are cross-sections taken along the lines XIII—XIII and XIV—XIV.

DETAILED DESCRIPTION OF PREFERRED EMBODIMENTS

Figure 3:
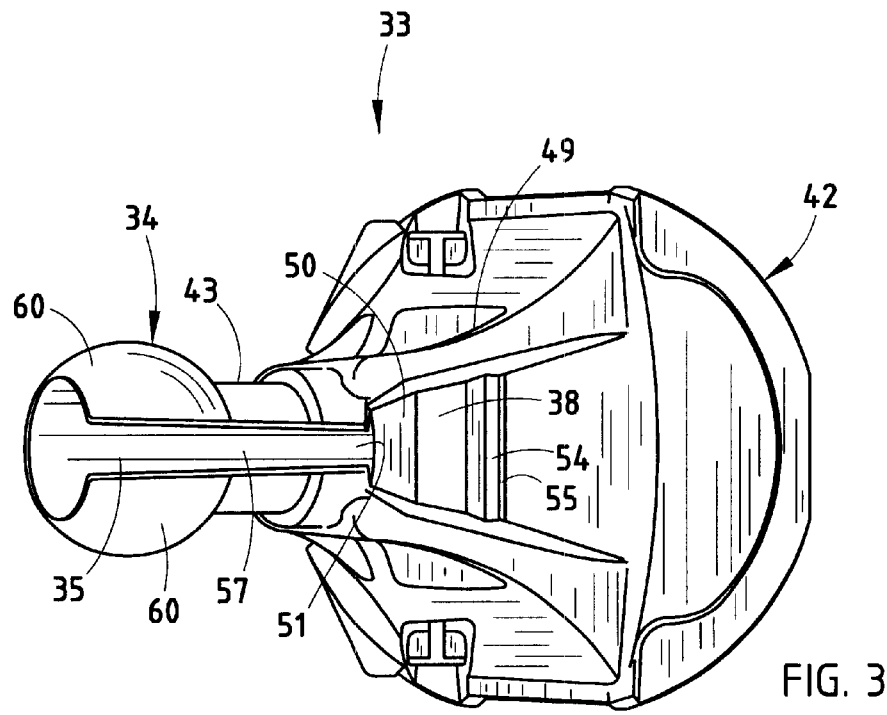

A mirror construction 30 (FIG. 1) includes an interior rearview mirror housing 31 having a socket 32, and includes a mirror mount 33 having a ball section 34 that angularly and adjustably engages the socket 32 to form a ball connection. The ball section 34 has a radially open portion 35 permitting wiring 36 of a wiring harness 36' to be laid laterally into the open portion of the ball section 34 to facilitate assembly. A holder (called a "wedge 37" hereafter) fits in the open portion 35 for holding the open portion 35 so that the ball section 34 cannot distort and collapse over time. The mount 33 includes a window 38 for snap attachment of an electrical connector 39 on the wiring 36 of wiring harness 36'.

Interior rearview mirrors for vehicles and front-window-mounted mirror mounts are well known in the industry, such that a detailed description of them is not required for an understanding of the present invention. For example, see the exemplary ball mount with internally-passed-through wiring described in U.S. Pat. No. 6,068,380 (issued May 30, 2000). Its disclosure is incorporated herein by reference in its entirety.

The illustrated mirror mount 33 is zinc die cast. However, it is contemplated that it can be made of other materials. Preferably, the mount 33 (FIG. 5) is cast to a final shape as molded. The mount 33 includes a body 41, an attachment section 42, a tube or neck section 43, and the ball section 34, all of which are integrally cast of contiguous continuous material. The attachment section 42 is shaped with attachment flanges 44 and stiffening ribs 45 for optimal stress distribution and strength, while minimizing total weight and maximizing moldability. Attachment flanges 44 are shaped to matingly securely engage an anchor piece or "button" 46 (FIG. 1) adhered to a vehicle front window 47 by adhesive 46'.

The body 41 (FIG. 5) includes opposing sidewalls 49 and a top wall 50 that define a channel 51 running longitudinally across a bottom of the mount 33. The channel 51 aligns with the open portion 35 of the ball section 34 and is shaped to receive wiring 36 as the wiring harness 36' is laid into the mount 33. The walls 49–50 further define a window 38 shaped to receive and hold the electrical connector 39 connected to an end of the wiring harness 36'. A rib 54 forms a detent or secondary window 55 adjacent the window 38. A spring-clip retainer 56 slides transversely into slits in the electrical connector 39 to hold the connector permanently in the window 38. A protrusion on the clip engages the secondary window 55 to frictionally retain itself in position.

Figure 4:
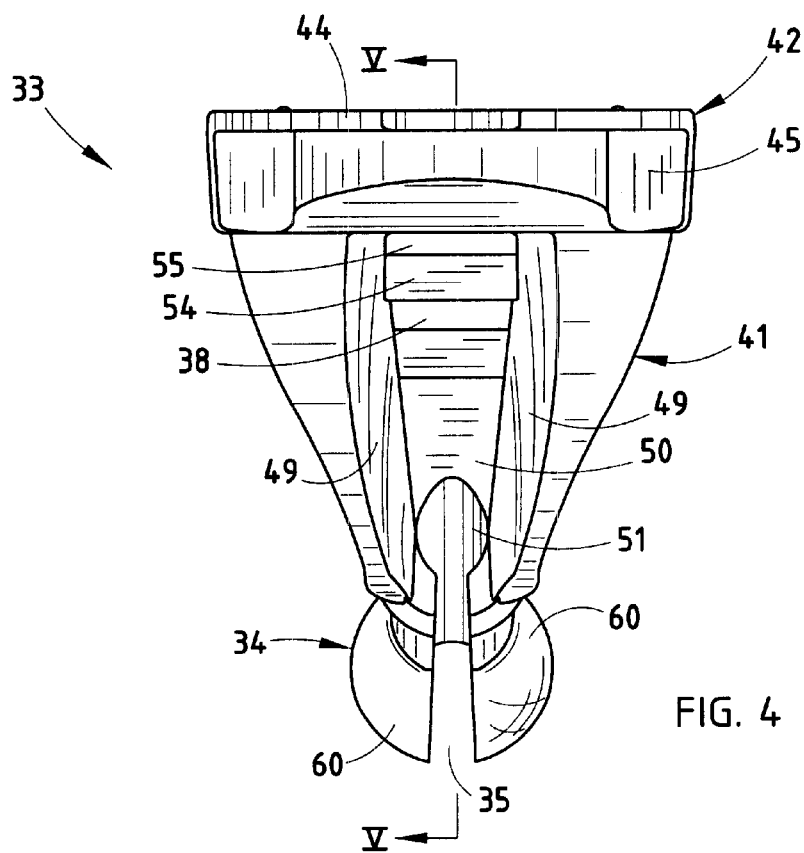

The neck section 43 (FIG. 5) of the mount 33 connects the ball section 34 to the body 41. The neck section 43 includes an open channel 57 that aligns with the channel 51 and the open portion 35 of the ball section 34. The open portion 35 and channels 51 and 57 define a tapered shape due to the draft angle on the sides of the die protrusion that forms them. The illustrated channel 57 extends a width to about 50% to 90% of a diameter of the neck section 43, or more preferably extends to about 70% to 80% of the diameter of the neck section 43, but it is noted that the channel width can be any size. The ball section 34 has a diameter larger than the neck section 43. The illustrated open portion 35 of the ball section 34 extends a width to about 50% to 90% of the ball section diameter, or more preferably about 60% to 70% of the ball section diameter, but the open portion 35 can be any size appropriate for the functional requirements of the mirror construction. On the illustrated mount 33, an inner surface of the channels 51 and 57 and the open portion 35 align and open downwardly toward a bottom of the mount 33 (FIG. 4) (when the mount is in its car-mounted position). However, it is contemplated that the channels and open portion could be on a top or a side of the mount. The illustrated channels 51 and 57 and open portion 35 have an oblong cross-sectional shape, enlarged in a center of the neck section 43 and in aligned areas on the ball section 34 where the wiring harness 36' is finally located, and include inner surfaces forming a longitudinally-extending draft angle so that the channels 51 and 57 and open portion 35 can be easily made by a puller in a die casting mold. The illustrated ball section 34 (FIGS. 4 and 6) includes arcuately extending arms 60 that extend about 270 to 350 degrees around the ball section, or more preferably about 300 to about 330 degrees, or most preferably about 320 degrees. However, the arms 60 can extend any distance desired as long as the ball is adequately formed. An alternative ball section 34' includes a ridge 34' at a location opposite the open portion 35. The ridge 34" is constructed to form a wedge shaped to engage ends 70 of arms 67 on a wedge 37, as described below, to provide structural support that more positively assures that the arms 67 of the wedge 37 cannot collapse.

Wedge 37 includes a cylinder-filling tube portion 62', a spherically-shaped protruding portion 63, and a tail portion 64, all integrally formed of contiguous continuous material, such as a polymeric material. The cylinder filling tube portion 62' (FIG. 14) has a center 66 and opposing arms 67. The center 66 and opposing arms 67 have an outer surface 68 shaped to engage and support the cylindrical shape of the ball section 34, and have an inner surface 69 that defines a continuous passageway for wiring harness 36'. The ends 70 of the arms 67 leave a gap for laterally receiving wiring harness 36' inside the tube portion 62' of the wedge 37. The center 66 and arms 67 are shaped to friction fit into the inner surface of the ball section 34, with the protruding portion 63 fitting into and filling the open spherical part of the open portion 35 of the ball section 34 and with the tail portion 64 extending from an end of the ball section 34. The outer surface of the protruding portion 63 completes the spherical shape of the outer spherical surface of the ball section 34. In the modified ball section 34' (FIG. 7), a ridge 34" is added to ball section 34' that fits between ends 70 of the arms 67 and outwardly holds the arms 67 so that the arms 67 cannot collapse toward each other. The ridge 34" can be tapered to bias the arms 67 outwardly to generate friction to hold the wedge 37 in place, if desired. Alternatively, the wedge 37 could include a detent or protrusion shaped to frictionally snap in place into a recess in the inner surface of the ball section 34, or could include adhesive, solder or otherwise be secured in place. It is noted that by selecting a material for the wedge that has a desired coefficient of thermal expansion and/or thermal stability, a torsional force adjustment can be closely controlled despite wide temperature variations.

It is noted that the illustrated wedge 37 holds the ball section shape in two ways. First, the protruding portions 63 and 64 engage the ends in the ball opening 35 creating an outward compressive pressure. Also, the tube portion 62' engages an inside surface of the extending ball arms 60 creating a radial outward pressure. It is intended that the term "holder" includes any one of these two ways, and further includes any other ways to hold a shape of the ball arms, such as by insetting a "C" shaped spring within the ball section 34, or by providing cavity fillers, reinforcements, and stress-distributing members.

The mirror housing 31 (FIG. 1) includes material defining the socket 32. There are various sockets that are known in the art and can be used. As illustrated, socket 32 is formed by arcuate surfaces on flanges 72, which forms a spherical shape for receiving and frictionally engaging the ball section 34 for angular adjustment. A rear portion of the flanges 72 is captured by a spring retainer 73. The flanges 72 and spring retainer 73 combine to capture the ball section 34 in a manner permitting multi-axial angular adjustment with a consistent and smooth adjustment force.

It is noted that the present mirror construction 30 can be assembled in different ways. For example, the assembly method of the present invention includes providing an interior rearview mirror assembly including a socket 32, and a mirror mount 33 adapted for attachment to a vehicle component, with the mirror mount 33 including a ball section 34 with a radially-open portion 35. The electrical connector 39 is attached to the wiring 36 by blocking to form the wiring harness 36', and then the wiring 36 is laid into the radially-open portion 35 of the ball section 34 and along the channels in the neck section 43 and the body 41 of the mount 33. The electrical connector 39 is then extended through the window in the mount and frictionally secured in position with the clip 56. The wedge 37 is placed in the open portion 35 of the ball section 34 in a position where it to holds the arcuate side arms 60 of the ball section 34 in an open condition so that the ball section 34 cannot distort and collapse over time. The ball section 34 is then operably fit into the socket 32 and the spring retainer 73 is added to complete the assembly, such that the ball section 34 is secured in the socket 32 and angularly adjustable in the socket 32. By removing the spring retainer 73 from mount 33, the wiring harness can be easily removed from the mount 33 and replaced without cutting off the electrical connector 39.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A mirror construction for attachment to a vehicle proximate a vehicle front window, comprising:

an interior rearview mirror assembly;

a mirror mount adapted for attachment to a vehicle component; and a ball connection including a ball section on one of the mirror assembly and the mirror mount, and including a socket on the other of the mirror assembly and the mirror mount, the ball section having a sphere-defining surface that slidably angularly engages a mating surface on the socket to permit angular adjustment and further having additional surfaces defining a laterally open portion that interrupts the sphere-defining surface to permit wiring to be laid laterally inside the ball section to facilitate assembly, the ball connection further including a separate holder engaging the additional surfaces for holding open the additional surfaces of the open portion in a spaced condition so that the ball section maintains a desired shape and the ball connection maintains a desired torsional frictional resistance to angular adjustment even after extended use.

2. The mirror construction defined in claim 1, wherein the holder includes a wedge engaging surfaces on the ball section forming the open section.

3. The mirror construction defined in claim 1, wherein the holder includes a protruding portion that lies flush with the sphere-defining surface.

4. The mirror construction defined in claim 1, wherein the holder includes a cylindrical-defining portion that fits into the open portion at a location spaced inwardly from the sphere-defining surface.

5. The mirror construction defined in claim 1, wherein the holder includes a C-shaped portion that fits snugly within the open portion.

6. The mirror construction defined in claim 1, wherein the ball section has an inner surface defining a hole having a first diameter, and the holder has arms that engage the inner surface and that extend partially around the hole.

7. The mirror construction defined in claim 1, wherein the holder helps retain the wiring in the ball section.

8. The mirror construction defined in claim 1, wherein the holder helps protect the wiring in the ball section.

9. The mirror construction defined in claim 1, wherein the mount includes a tubular section defining a laterally-open first channel and the open portion of the ball section defines a second channel that aligns with the first channel.

10. The mirror construction defined in claim 1, wherein the ball section is located on the mirror mount.

11. The mirror construction defined in claim 10, wherein the mirror mount includes walls shaped to receive an electrical connector.

12. The mirror construction defined in claim 1, including a wiring harness with wiring laid into the open portion.

13. The mirror construction defined in claim 12, wherein the wiring harness includes an electrical connector, and wherein the mount has a recess that receives the electrical connector.

14. The mirror construction defined in claim 13, wherein the electrical connector includes a clip for securing the electrical connector to the mount.

15. The mirror construction defined in claim 1, wherein the mount includes an opening, and including wiring laid into the open portion and that extends up through opening.

16. The mirror construction defined in claim 1, wherein the holder, when installed, extends inside a hole in the ball section and fills the open portion around the sphere-defining surface of the ball section.

17. The mirror construction defined in claim 16, wherein the holder has opposing arcuate wings that extend at least about 180 degrees around an inside of the ball section.

18. A mirror construction for attachment to a vehicle proximate a vehicle front window, comprising:

an interior rearview mirror assembly including a socket;

a mirror mount adapted for attachment to a vehicle component and including a ball section; and the ball section angularly and adjustably engaging the socket to form a ball connection, the ball section having surfaces defining a radially and laterally open portion permitting wiring to be laid laterally into the ball section to facilitate assembly, and further including a separate holder engaging the surfaces of the ball section for holding the surfaces in a spaced condition to maintain a shape of the ball section so that the ball section cannot distort and collapse over time.

19. The mirror construction defined in claim 18, wherein the holder comprises a wedge in the open portion.

* * * * *